US012623591B2

(12) United States Patent
    Otaka et al.

(10) Patent No.: US 12,623,591 B2
(45) Date of Patent: May 12, 2026

(54) VEHICLE

(71) Applicant: HONDA MOTOR CO., LTD., Tokyo (JP)

(72) Inventors: Masaru Otaka, Wako (JP); Ryusuke Tamanaha, Wako (JP); Takahiro Iijima, Tokyo (JP); Yusuke Oi, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 18/918,156

(22) Filed: Oct. 17, 2024

(65) Prior Publication Data

US 2025/0042333 A1     Feb. 6, 2025

Related U.S. Application Data

(63) Continuation of application No. 17/783,662, filed as application No. PCT/JP2019/049576 on Dec. 18, 2019, now Pat. No. 12,145,501.

(51) Int. Cl.
    B60Q 1/54      (2006.01)
    B60Q 1/50      (2006.01)
    H04W 4/40      (2018.01)

(52) U.S. Cl.
    CPC .............. B60Q 1/543 (2022.05); H04W 4/40 (2018.02)

(58) Field of Classification Search
    CPC ...................................................... B60Q 1/543
    USPC ........................................................ 340/438
    See application file for complete search history.

(56) References Cited

U.S. PATENT DOCUMENTS

| | | | | |
|---|---|---|---|---|
| 9,979,924 | B1 * | 5/2018 | Fink | H04N 5/77 |
| 11,063,639 | B1 * | 7/2021 | Legg | H04B 7/12 |
| 11,749,031 | B1 * | 9/2023 | Rusu | G07C 5/0883 |
| | | | | 701/33.3 |
| 2011/0037581 | A1 * | 2/2011 | Santori | H03G 3/3005 |
| | | | | 340/438 |
| 2012/0087303 | A1 * | 4/2012 | Kwon | H04W 48/10 |
| | | | | 370/328 |
| 2012/0294238 | A1 * | 11/2012 | Uhler | G08G 1/017 |
| | | | | 370/328 |
| 2014/0274048 | A1 | 9/2014 | Lavi et al. | |
| 2015/0002310 | A1 | 1/2015 | Guo et al. | |
| 2015/0312404 | A1 | 10/2015 | Abramson et al. | |

(Continued)

FOREIGN PATENT DOCUMENTS

| | | |
|---|---|---|
| CN | 108075553 | 5/2018 |
| EP | 3528480 | 8/2019 |

(Continued)

OTHER PUBLICATIONS

International Search Report and Written Opinion for International Application No. PCT/JP2019/049576 mailed on Feb. 4, 2020, 11 pages.

(Continued)

*Primary Examiner* — Travis R Hunnings
(74) *Attorney, Agent, or Firm* — Amin, Turocy & Watson, LLP

(57) ABSTRACT

A movable vehicle includes an access point functional unit that includes an antenna and functions as an access point by wirelessly communicating with a terminal device around the vehicle, and a notifier that notifies the surroundings that the vehicle is functioning as an access point.

10 Claims, 13 Drawing Sheets

(56) References Cited

U.S. PATENT DOCUMENTS

| | | |
|---|---|---|
| 2017/0295458 A1 | 10/2017 | Gao et al. |
| 2018/0077538 A1* | 3/2018 | Matus ..................... H04W 4/40 |
| 2018/0141456 A1 | 5/2018 | Maeda |
| 2019/0007795 A1* | 1/2019 | Kim ........................ H04L 67/12 |
| 2020/0037379 A1* | 1/2020 | Zellen ................... H04W 76/14 |
| 2021/0091852 A1* | 3/2021 | Parangattil ............. G06V 20/20 |
| 2022/0167255 A1* | 5/2022 | Woodburn ............ H04W 12/73 |

FOREIGN PATENT DOCUMENTS

| | | |
|---|---|---|
| JP | 2018-106352 | 7/2018 |
| JP | 2019-117624 | 7/2019 |
| JP | 2019-521536 | 7/2019 |
| WO | 2017/180561 | 10/2017 |
| WO | 2018/232843 | 12/2018 |

OTHER PUBLICATIONS

Non-Final Office Action for U.S. Appl. No. 17/783,662 dated Dec. 15, 2023.
Final Office Action for U.S. Appl. No. 17/783,662 dated Mar. 22, 2024.
Chinese Office Action for Chinese Patent Application No. 201980102881.9 dated Jan. 22, 2025.
Palacios, et al. Dynamic Multipath Connection for Low-Latency Vehicle-to-Everything (V2X) Communications, 2018 IEEE International Symposium on Broadband Multimedia Systems and Broadcasting (BMSB).

\* cited by examiner

TIME

VEHICLE

CROSS-REFERENCE TO RELATED APPLICATIONS

This application is a Continuation of application Ser. No. 17/783,662 filed on Jun. 9, 2022, the content of which is incorporated herein by reference, which is a Section 371 National Phase of PCT Internation application PCT/JP2019/049576 filed Dec. 18, 2019, the content of which is incorporated herein by reference.

TECHNICAL FIELD

The present invention relates to a vehicle.

BACKGROUND ART

For example, an access point that mediates transmission of radio waves between a terminal device and a base station may be provided in an environment in which the terminal device is used. In recent years, it has been considered to use a vehicle as an access point. There is a technology for delivering an advertisement to a terminal connected to an access point when a vehicle is used as the access point (see, for example, Patent Literature 1).

CITATION LIST

Patent Literature

[Patent Literature 1]
Japanese Unexamined Patent Application, First Publication No. 2019-521536

SUMMARY OF INVENTION

Technical Problem

When a vehicle is used as an access point, it is difficult for a user of a terminal device to recognize whether or not a surrounding vehicle is functioning as the access point.

The present invention has been made in consideration of such circumstances, and one object of the present invention is to provide a vehicle that can be easily recognized as having an access point function.

Solution to Problem

A vehicle according to the present invention adopts the following configurations.

(1): A vehicle according to an aspect of the present invention is a movable vehicle, including: an access point functional unit including an antenna and configured to function as an access point by wirelessly communicating with a terminal device around the vehicle; and a notifier configured to notify surroundings that the vehicle is functioning as an access point.

(2): In the aspect of (1) above, the notifier includes a lamp body, and causes the lamp body to light when the vehicle is functioning as an access point.

(3): In the aspect of (2) above, the lamp body includes at least one of a turn signal lamp, a position lamp, a headlight, a tail lamp, or an in-vehicle lamp.

(4): In the aspect of (3) above, the notifier includes the turn signal lamp, and causes the turn signal lamp to constantly light when the vehicle is functioning as an access point.

(5): In the aspect of (3) above, the notifier includes an in-vehicle lamp and causes the in-vehicle lamp to blink when the vehicle is functioning as an access point.

(6): In the aspect of (2) above, the vehicle further includes: an illuminance measurer configured to measure an illuminance around a vehicle body of the vehicle, wherein the notifier decreases an amount of light emitted by the lamp body in a case in which the illuminance measured by the illuminance measurer is lower than a predetermined illuminance as compared with a case in which the illuminance measured by the illuminance measurer is equal to or higher than the predetermined illuminance.

(7): In the aspect of (2) above, the antenna has directivity, the lamp body is disposed in a plurality of places of a vehicle body of the vehicle, and the notifier makes an amount of light emitted by the lamp body attached to a first side to which the antenna is directed in the vehicle body larger than an amount of light emitted by the lamp body attached to a place other than the first side.

(8): In the embodiment of (3) above, the vehicle further includes: a storage battery, wherein the notifier makes an amount of light emitted by the lamp body in a case in which an amount of stored electricity of the storage battery is equal to or larger than a predetermined amount of stored electricity larger than that in a case in which the amount of stored electricity of the storage battery is smaller than the predetermined amount of stored electricity.

(9): In the aspect of (2) above, the vehicle further includes: an externally rechargeable storage battery, wherein the notifier makes an amount of light emitted by the lamp body in a case in which the storage battery is externally charged larger than that in a case in which the storage battery is not externally charged.

(10): In the aspect of (2) above, the vehicle further includes: an acquirer configured to acquire information on a communication quality between the wireless base station and the access point functional unit, wherein the notifier makes an amount of light emitted by the lamp body in a case in which the communication quality acquired by the acquirer is equal to or higher than predetermined quality different from that in a case in which the communication quality acquired by the acquirer is lower than the predetermined quality.

(11): In the aspect of (1) above, the notifier notifies the surroundings of the vehicle that a wireless connection has been established when the wireless connection has been established between the access point functional unit and the terminal device.

Advantageous Effects of Invention

According to (1) to (11), it is possible to cause the fact that the access point function is included to be easily recognized.

According to (2) to (10), it is possible to cause the fact that the access point function is included to able to be easily recognized due to visual appeal.

According to (3) to (5), it is possible to effectively use existing equipment of the vehicle.

According to (4) and (5), it is possible to cause the fact that the access point function is included to be recognized while making it difficult to cause confusion with the time during constant use of the existing equipment.

According to (6), it is possible to cause the fact that the access point function is included to be easily recognized using a method suitable for a surrounding environment.

According to (7), it is possible to deliver a directivity direction of the antenna to the user in an easy-to-understand manner.

According to (8) and (9), the access point function can be provided within a range in which an influence on an original performance of the vehicle is small.

According to (10), it is possible to cause communication quality of the access point to be recognized.

According to (11), it is possible to cause the vehicle to which a wireless connection has been made to be easily recognized.

DESCRIPTION OF EMBODIMENT

Hereinafter, an embodiment of a vehicle of the present invention will be described with reference to the drawings. The following embodiment does not limit the invention according to the claims, and all combinations of characteristics described in the embodiment are not essential to a solution to a problem. Although it is assumed that the vehicle 10 is an electric vehicle, the vehicle 10 is preferably a vehicle having a secondary battery that supplies power for traveling of the vehicle 10 mounted thereon, and may be a hybrid vehicle or a fuel cell vehicle. The vehicle 10 may be a gasoline vehicle or a diesel vehicle that does not have a secondary battery for supplying power for traveling.

Hereinafter, the vehicle of the embodiment will be described.

[Overall Configuration]

Figure 1:
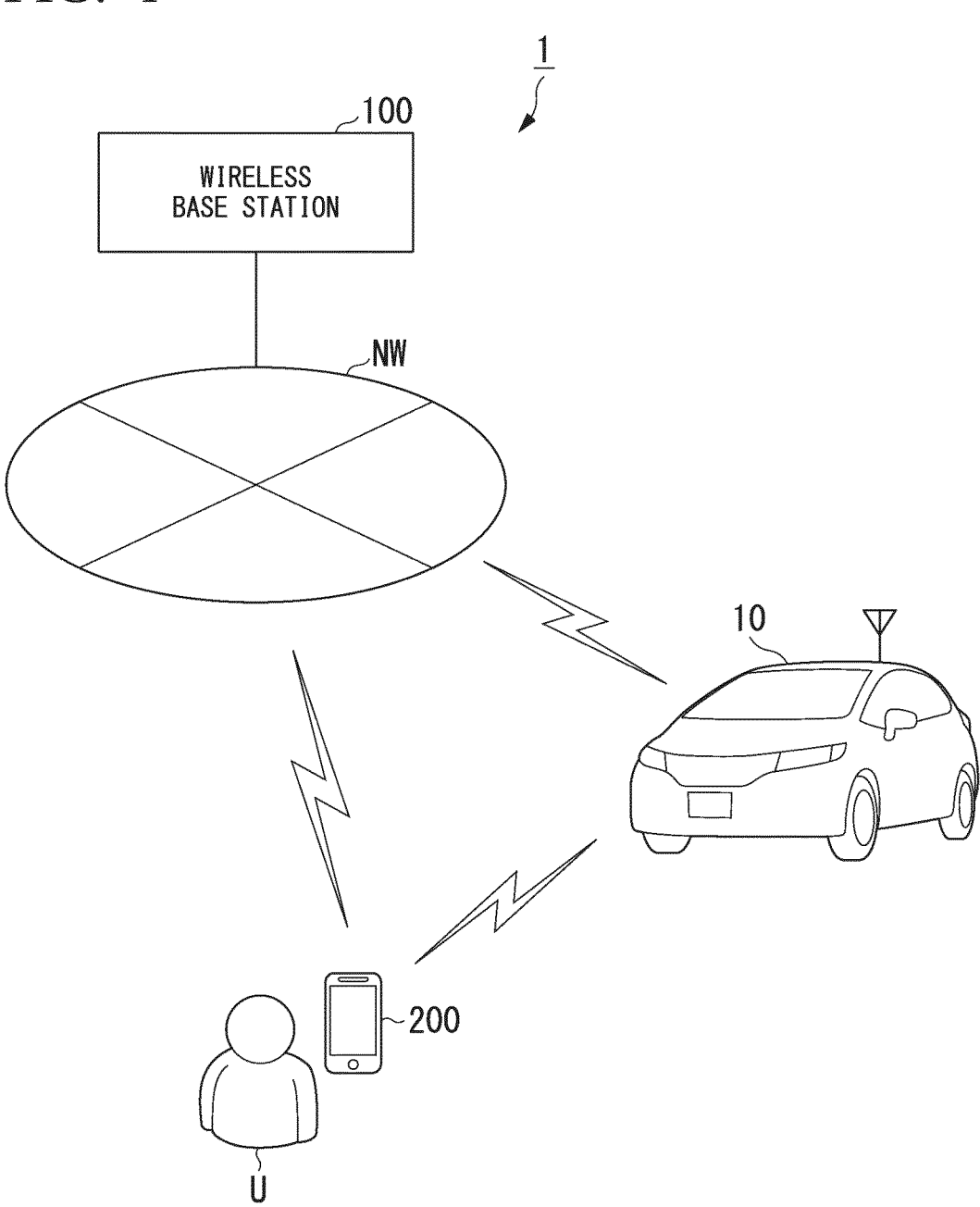
FIG. 1 is a diagram showing an example in which a vehicle according to an embodiment mediates communication between a wireless base station 100 and a mobile terminal 200.

FIG. 1 is a diagram showing an example in which a vehicle according to an embodiment mediates communication between a wireless base station 100 and a mobile terminal 200. As shown in FIG. 1, a vehicle 10 is movable and can communicate with the wireless base station 100 via a network NW. The network NW is, for example, a cellular network.

The mobile terminal 200 of the user U is a terminal device capable of wirelessly communicating with the vehicle 10 via a wireless LAN such as Wi-Fi (registered trademark). The mobile terminal 200 can wirelessly communicate with the wireless base station 100 by causing the vehicle 10 to mediate as an access point. The mobile terminal 200 can also wirelessly communicate with the wireless base station 100 via the network NW without mediation in the vehicle 10. The terminal device may be a terminal device other than the mobile terminal.

Figure 2:
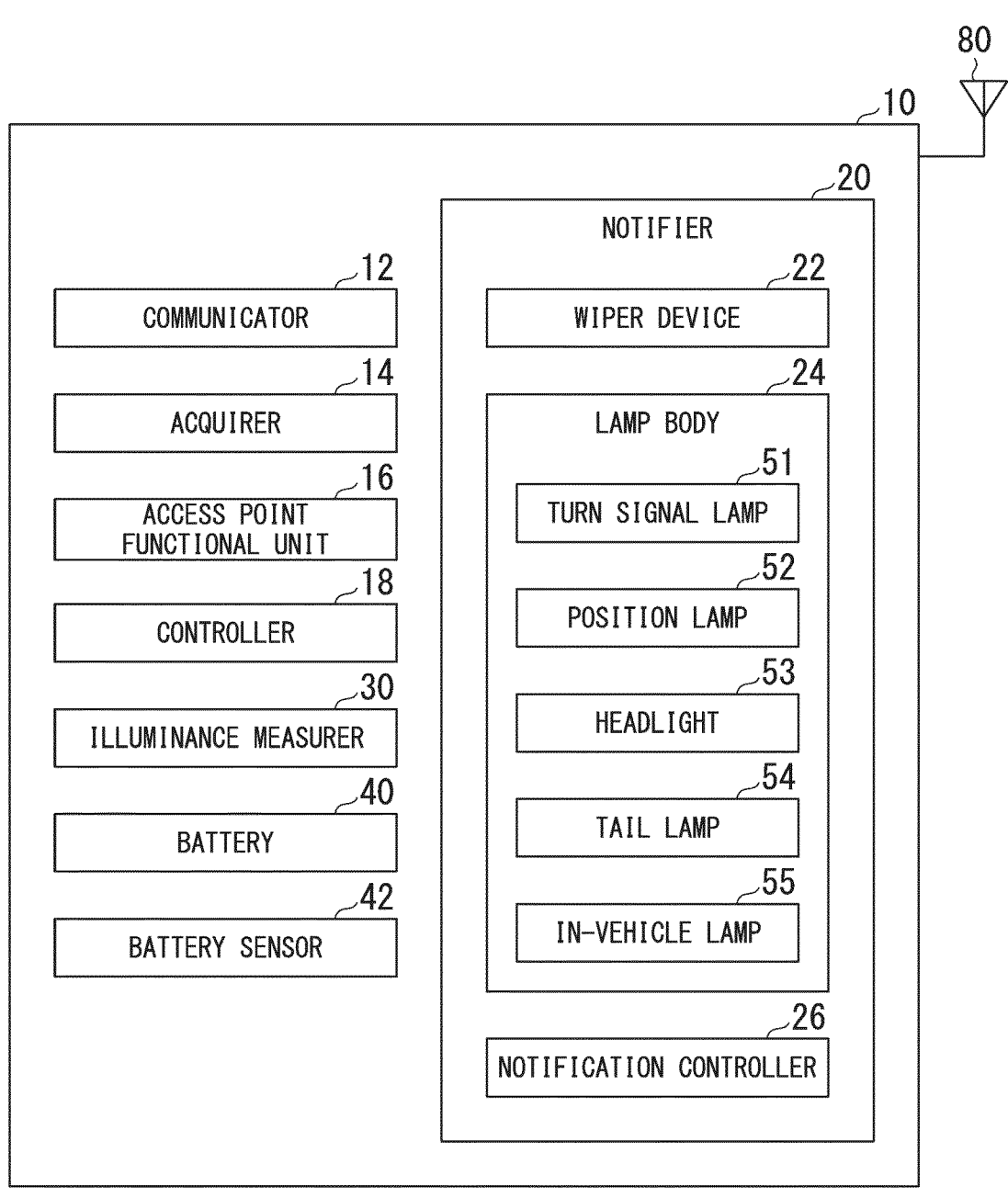
FIG. 2 is a diagram showing an example of a configuration of the vehicle 10.

FIG. 2 is a diagram showing an example of a configuration of the vehicle 10. As shown in FIG. 2, the vehicle 10 includes, for example, a communicator 12, an acquirer 14, an access point functional unit 16, a controller 18, a notifier 20, an illuminance measurer 30, a battery 40, and a battery sensor 42.

The communicator 12 includes a wireless module for connection to a wireless communication network such as a wireless LAN and a cellular network. The acquirer 14 acquires communication quality between the wireless base station 100 and the access point functional unit 16. The communication quality includes, for example, the presence or absence of a communication restriction, a status of transmission and reception, and success or failure of reception. The acquirer 14 outputs information on the acquired communication quality to the notification controller 26.

The access point functional unit 16 includes an antenna 80. The access point functional unit 16 receives a connection request from an external device such as the mobile terminal 200, for example. When the access point functional unit 16 receives the connection request from the mobile terminal 200 within an access point provision time, the access point functional unit 16 mediates communication between the mobile terminal 200 and the wireless base station 100 via the network NW. The access point functional unit 16 functions as an access point by wirelessly communicating with the mobile terminal 200 around the vehicle 10. Because the access point functional unit 16 functions as an access point, the vehicle 10 functions as an access point.

The controller 18 determines whether or not it is the access point provision time. The access point provision time is a time in which an access point provision condition is satisfied. The access point provision condition is, for example, either that the vehicle 10 is parked and an amount of charging of the battery 40 is equal to or larger than a reference amount of stored electricity or that the battery 40 is externally charged (being charged). The reference amount of stored electricity is an amount of stored electricity for determining that the access point provision condition is satisfied when the battery 40 is not being charged.

The reference amount of stored electricity is set to, for example, a remaining amount of the SOC of the battery 40 that does not interfere with the traveling of the vehicle 10. The reference amount of stored electricity is an arbitrary value set in advance, and is, for example, 60%. The reference amount of stored electricity may vary depending on a situation of the vehicle 10 that has predicted a behavior of the owner. For example, the reference amount of stored electricity in a case in which a destination of the vehicle 10 is set to a far place may be made larger than that in a case in which the destination is set to a near place.

The access point functional unit 16 is available during the access point provision time. The controller 18 outputs access point information such as availability of the access point function and start of use of the access point function to the notifier 20.

An operation mode is set in the controller 18. The operation mode includes an on mode and an off mode. The on mode is an operation mode when the vehicle 10 is functioning as an access point. The off mode is an operation mode when the vehicle 10 is not functioning as the access point. The controller 18 has a function of maintaining the operation mode in the off mode according to an operation of the owner of the vehicle 10.

The on mode includes a normal mode and a power saving mode. The normal mode is an on mode, which is an operation mode when the power saving mode is not set. The power saving mode is an operation mode for performing notification of the notifier 20 with less energy consumption than that of the normal mode.

The notifier 20 includes, for example, a wiper device 22, a lamp body 24, and a notification controller 26. The wiper device 22 includes a wiper W shown in FIG. 3, and a drive controller that drives the wiper W. The wiper device 22 drives the wiper device 22 provided in the vehicle 10 according to an instruction of the notification controller 26. The lamp body 24 includes, for example, turn signal lamps 51, position lamps 52, headlights 53, tail lamps 54, and in-vehicle lamps 55.

The notifier 20 notifies the surroundings that the vehicle 10 is functioning as an access point. For example, when the vehicle 10 functions as an access point, the notifier 20 drives the wiper W or causes each component of the lamp body 24 to light or blink. The notifier 20 adjusts an aspect of notification according to the operation mode set by the controller 18. For example, the notifier 20 reduces an amount of light emitted by the headlights 53 in a case in which the controller 18 sets the power saving mode to the normal mode, as compared with an amount of light emitted by the headlights 53 in a case in which the controller 18 sets the operation mode to the normal mode, thereby reducing energy consumption. Thus, in the power saving mode, for example, an output of the lamp body 24 is made lower or an operating speed of a movable object such as the wiper W is made lower as compared with that in the normal mode.

The respective components of the lamp body 24 are disposed at a plurality of places in the vehicle body of the vehicle 10. The lamp body 24 causes respective components such as the turn signal lamps 51, the position lamps 52, the headlights 53, the tail lamps 54, and the in-vehicle lamp 55 to light or blink under the control of the notification controller 26. The notification controller 26 outputs an instruction to the drive controller of the wiper device 22 or controls each component of the lamp body 24 on the basis of the communication quality transmitted by the acquirer 14, an illuminance transmitted by the illuminance measurer 30, information on the SOC of the battery 40 transmitted by the battery sensor 42, and the like.

Figure 3:
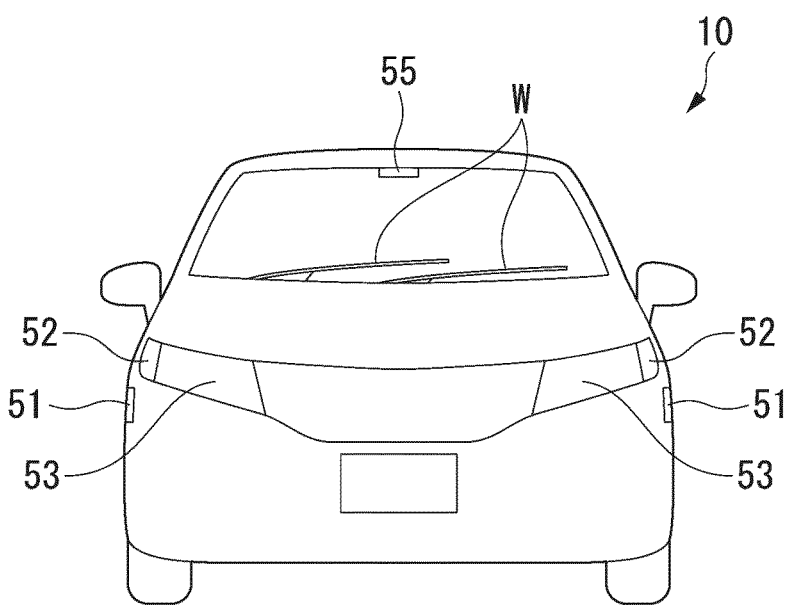
FIG. 3 is a diagram showing an example of the vehicle 10 viewed from the front side.
Figure 4:
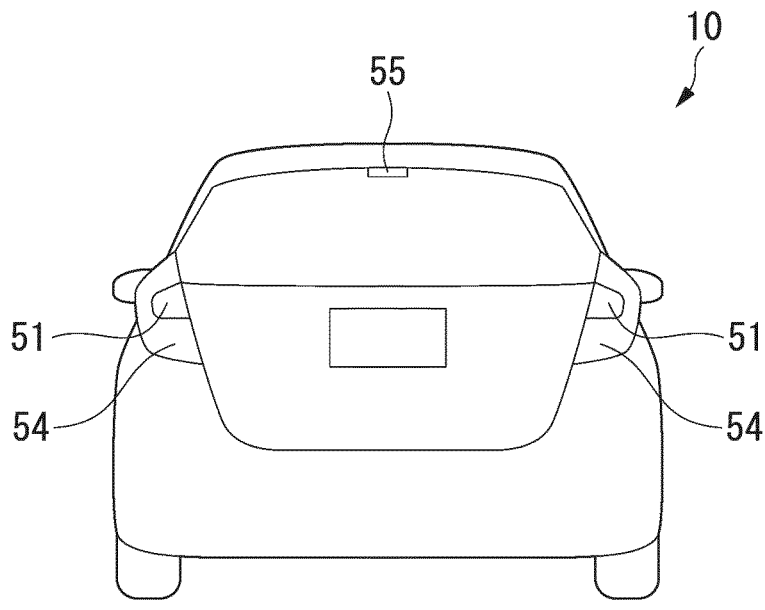
FIG. 4 is a diagram showing an example of the vehicle 10 viewed from the back side.

FIG. 3 is a diagram showing an example of the vehicle 10 viewed from the front side. FIG. 4 is a diagram showing an example of the vehicle 10 viewed from the back side. As shown in FIGS. 2 and 3, the wiper W is disposed, for example, on a windshield portion of the vehicle 10. The turn signal lamps 51 are disposed, for example, at left and right side surface portions of the vehicle 10 as seen from the front side and at left and right positions on the back side of the vehicle 10.

The position lamps 52 are disposed at left and right positions of the front of the vehicle 10, for example. The headlights 53 are disposed, for example, at positions slightly centered from the position lamps on the front side of the vehicle 10. The tail lamps 54 are disposed, for example, at positions surrounding the turn signal lamps 51 on the back side of the vehicle 10. The in-vehicle lamp 55 are disposed, for example, in the vehicle cabin of the vehicle 10.

The wiper W operates on the basis of control according to an original purpose of use. For example, the wiper W operates in an intermittent operation when it is raining lightly, operates in a normal operation when it is raining with a normal amount of rain, and operates at a high speed when it is raining heavily. Each component of the lamp body 24 lights or blinks on the basis of the control according to an original purpose of use. For example, the turn signal lamps 51 blink on the basis of an operation of a turn signal switch (not shown). Each component of the lamp body 24 is based on an operation according to the original purpose of use, and lighting or blinking is controlled by the notification controller 26. The lighting or blinking of the respective components of the lamp body 24 is controlled collectively or individually by the notification controller 26.

The illuminance measurer 30 is provided outside the vehicle 10, for example. The illuminance measurer 30 measures illuminance around the vehicle 10. A measurement result of the illuminance measurer 30 is, for example, a low illuminance at night and a high illuminance in daytime. The illuminance measurer 30 outputs information on the measured illuminance to the notification controller 26.

The battery 40 is, for example, an externally rechargeable secondary battery (storage battery) such as a lithium ion battery. Power introduced by external charging from an external charger of the vehicle 10 is stored in the battery 40 and discharging for traveling of the vehicle 10 is performed. The charger is installed, for example, at a home of the owner of the vehicle 10 or at a charging station in a city. Therefore, the battery 40 is charged, for example, at the home of the owner or the charging station in the city.

The battery sensor 42 includes, for example, a current sensor, a voltage sensor, and a temperature sensor. The battery sensor 42 detects, for example, a current value, a voltage value, and a temperature of the battery 40. The battery sensor 42 calculates a state of charge (SOC) that is an amount of electricity stored in the battery 40 on the basis of the detected current value, voltage value, and temperature of the battery 40. The battery sensor 42 outputs information on the calculated SOC of the battery 40 to the controller 18 and the notification controller 26.

The antenna 80 is disposed outside the vehicle 10, for example. The antenna 80 has directivity. The antenna 80 includes, for example, a plurality of (two or more) antenna elements. An antenna controller (not shown) is provided inside the vehicle 10. The antenna controller can perform beamforming by adjusting a positional relationship among a plurality of antenna elements in the antenna 80 to adjust a directivity direction of the antenna 80. The antenna 80 transmits radio waves with directivity when transmitting the radio waves in a case in which the antenna controller adjusts the positional relationship among the plurality of antenna elements. Although the directivity of the antenna 80 can be adjusted in the embodiment, the antenna 80 provided in the vehicle 10 may be an antenna whose directivity is fixed and cannot be adjusted.

Although the mobile terminal 200 can be wirelessly connected to the vehicle 10 by a wireless LAN, for example, the mobile terminal 200 may be able to wirelessly connected to the vehicle 10 via the network NW instead of or in addition to the aspect in which the mobile terminal 200 can be wirelessly connected to the vehicle 10 by the wireless LAN. Although the mobile terminal 200 can be wirelessly connected to the wireless base station 100 via the network NW, the mobile terminal 200 may be unable to be wirelessly connected to the wireless base station 100 via the network NW.

Next, an operation in the vehicle 10 will be described with reference to FIGS. 5 to 9. FIGS. 5 to 9 are flowcharts showing an example of processing that is executed by the vehicle 10. The controller 18 determines whether or not it is within the access point provision time (step S101). "Within the access point provision time" is, for example, a time in which the vehicle 10 is parked and the owner of the vehicle 10 does not maintain the operation mode of the controller 18 in the off mode.

When the controller 18 determines that it is not within the access point provision time, the controller 18 sets the operation mode to the off mode (step S103). Thereafter, the vehicle 10 ends the processing shown in FIG. 5. When the controller 18 determines that it is within the access point provision time, the acquirer 14 acquires the communication quality between the wireless base station 100 and the access point functional unit 16 (step S105). Subsequently, the controller 18 determines whether or not the battery 40 is being charged (step S107).

When the controller 18 determines that the battery 40 is being charged, the controller 18 sets the operation mode to the normal mode (the on mode) (step S109). Thereafter, the vehicle 10 ends the processing shown in FIG. 5. The controller 18 acquires the SOC of the battery 40 when the controller 18 determines that the battery 40 is not being charged. The controller 18 determines whether or not the acquired SOC of the battery 40 is equal to or larger than the reference amount of stored electricity (step S111).

When the controller 18 determines that the acquired SOC of the battery 40 is equal to or larger than the reference amount of stored electricity, the controller 18 sets the operation mode to the power saving mode (the on mode) (step S113). Thereafter, the vehicle 10 ends the processing shown in FIG. 5. When the controller 18 determines that the acquired SOC of the battery 40 is not equal to or larger than the reference amount of stored electricity (is smaller than the reference amount of stored electricity), the controller 18 sets the operation mode to the off mode (step S103). Thereafter, the vehicle 10 ends the processing shown in FIG. 5.

Figure 6:
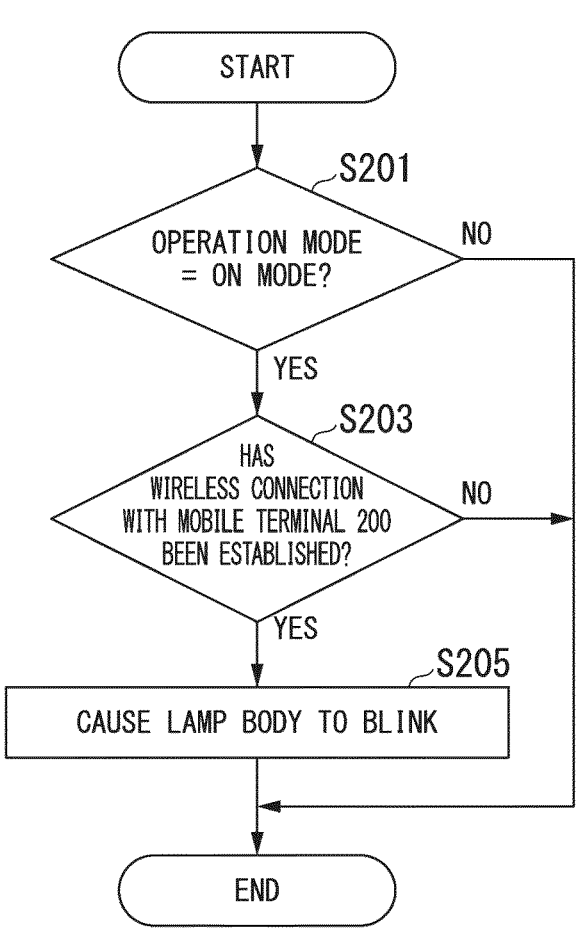
FIG. 6 is a flowchart showing an example of processing that is executed by the vehicle 10.

Subsequently, processing when the vehicle 10 starts the function as an access point will be described with reference to FIG. 6. The controller 18 determines whether or not the operation mode is the on mode (the normal mode or the power saving mode) (step S201). When the controller 18 determines that the operation mode is not the on mode (is the off mode), the vehicle 10 ends the processing shown in FIG. 6.

When the controller 18 determines that the operation mode is the on mode, the controller 18 determines whether or not a wireless connection with the mobile terminal 200 around the vehicle 10 has been established (step S203). When the controller 18 determines that the wireless connection has not been established, the vehicle 10 ends the processing shown in FIG. 6.

When the controller 18 determines that the wireless connection has been established, the notification controller

26 causes the lamp body 24 to blink (step S205). The notifier 20 notifies the user of the mobile terminal 200 that the wireless connection has been established, by causing the lamp body 24 to blink. Thus, the vehicle 10 ends the processing shown in FIG. 6.

When the lamp body 24 is caused to blink in the vehicle 10, an aspect thereof may be any aspect. For example, all the components of the lamp body 24 may be caused to blink a predetermined number of times, such as three times. Some of the lamp body 24, such as the headlights 53 and the tail lamps 54, may be caused to blink a predetermined number of times. When a plurality of components of the lamp body 24 are caused to blink, the number of times the components blink may differ among the components. The components caused to blink in the lamp body 24 or the number of times the components blink may differ depending on a surrounding environment of the vehicle 10. The surrounding environment of the vehicle 10 may be, for example, any one of daytime and night. The surrounding environment of the vehicle 10 may be, for example, the communication quality between the wireless base station 100 and the access point functional unit 16. The surrounding environment of the vehicle 10 may be, for example, a distance between the vehicle 10 and the mobile terminal 200. The lamp body 24 may be caused to light (constantly light) instead of or in addition to the blinking. In the notifier 20, the wiper device 22 may drive the wiper W, instead of or in addition to causing the lamp body 24 to light or blink.

Figure 5:
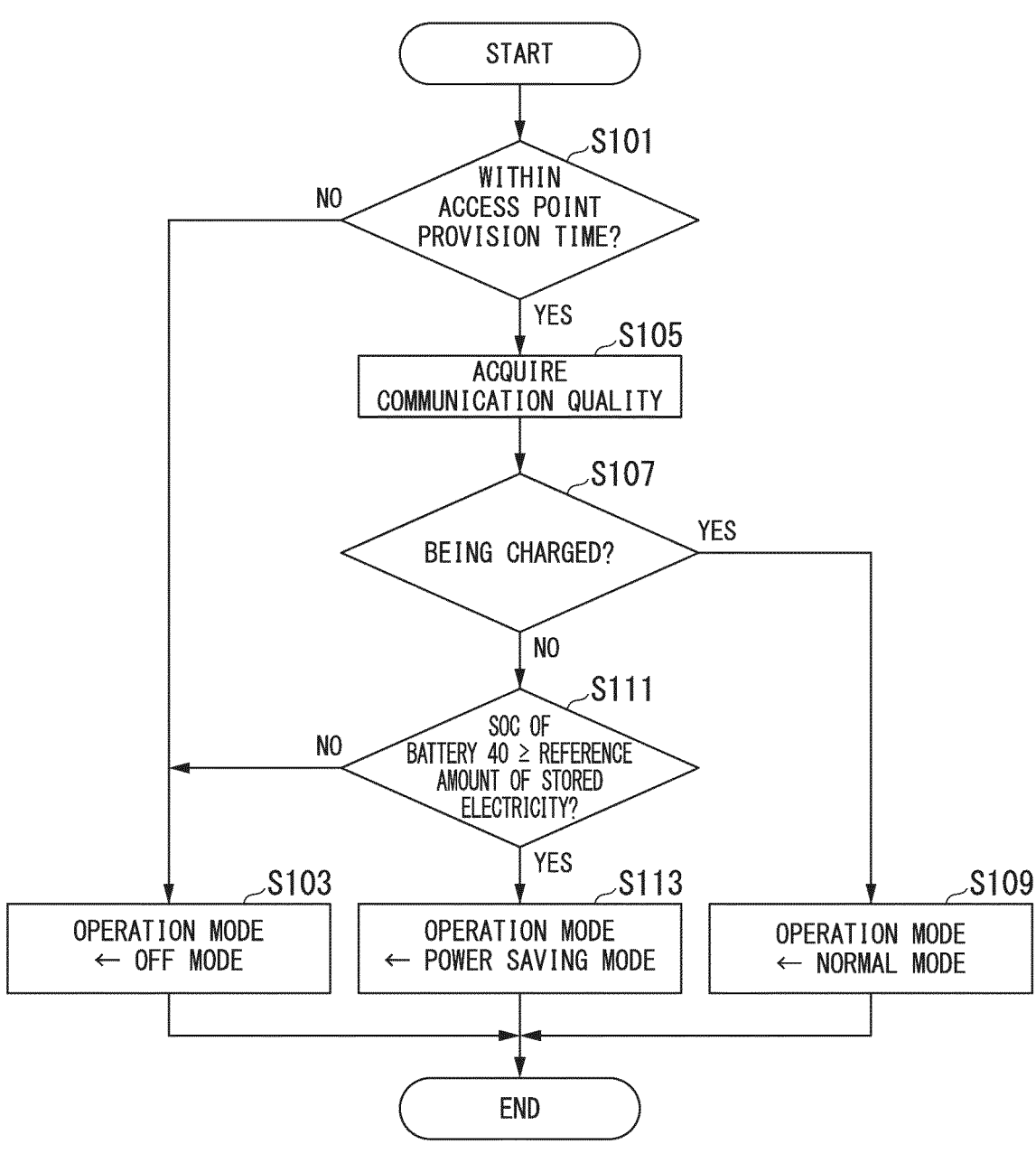
FIG. 5 is a flowchart showing an example of processing that is executed by the vehicle 10.
Figure 7:
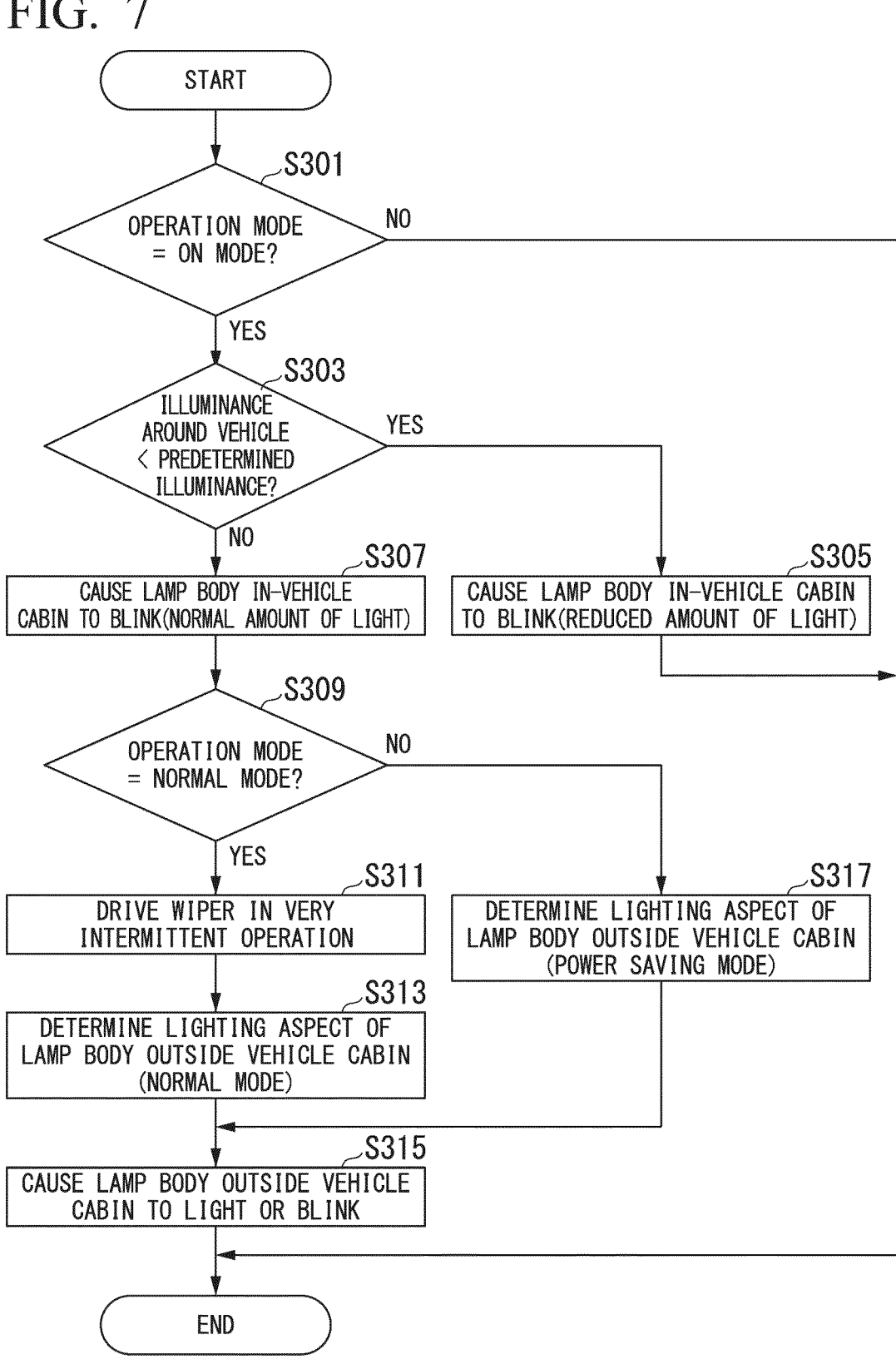
FIG. 7 is a flowchart showing an example of processing that is executed by the vehicle 10.

Subsequently, processing following FIG. 5 will be described with reference to FIG. 7. The controller 18 determines whether or not the operation mode is the on mode (step S301). When the controller 18 determines that the operation mode is not the on mode (off mode), the vehicle 10 ends the processing shown in FIG. 7.

When the controller 18 determines that the operation mode is the on mode, the notification controller 26 determines whether or not an illuminance around the vehicle measured by the illuminance measurer 30 is lower than predetermined illuminance (step S303). The predetermined illuminance may be any illuminance, and is, for example, an illuminance at which a time is determined to be a daytime or not to be night.

Figure 9:
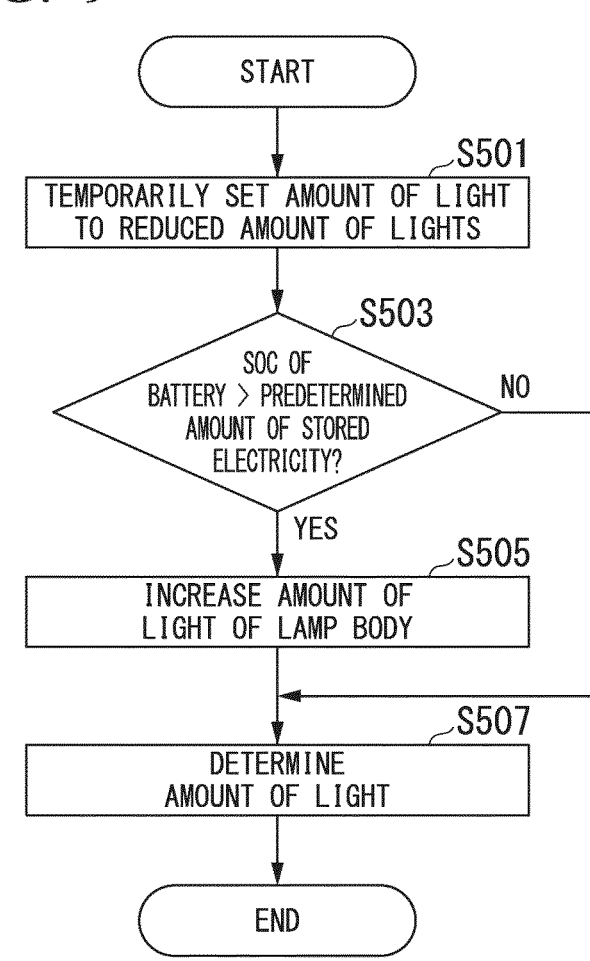
FIG. 9 is a flowchart showing an example of processing that is executed by the vehicle 10.

When it is determined that the illuminance around the vehicle is less than the predetermined illuminance, the notification controller 26 causes the in-vehicle lamp 55 to blink as shown in FIG. 9 (step S305). In this case, the notification controller 26 reduces an amount of light of the in-vehicle lamp 55 as compared with a normal amount of light to cause the in-vehicle lamp 55 to blink. Thereafter, the vehicle 10 ends the processing shown in FIG. 7.

When it is determined that the illuminance around the vehicle is not less than the predetermined illuminance (or more than the predetermined illuminance), the notification controller 26 causes the in-vehicle lamp 55, which is the lamp body 24 in the vehicle cabin, to blink (step S307). In this case, the notification controller 26 causes the in-vehicle lamp 55 to blink with an amount of light of the in-vehicle lamp 55 as the normal amount of light.

Subsequently, the controller 18 determines whether or not the operation mode is the normal mode (step S309). When the controller 18 determines that the operation mode is the normal mode, the notification controller 26 outputs an instruction to drive the wiper W to the drive controller of the wiper device 22. The wiper W can be driven in a normal operation in which the wiper W operates at a normal speed and an intermittent operation in which a speed is slower than the normal speed when removing raindrops on the windshield. When the wiper device 22 drives the wiper W on the basis of an instruction output by the notification controller 26, the wiper device 22 drives the wiper W in a very intermittent operation at a speed slower than that in the intermittent operation.

Subsequently, the notification controller 26 determines a lighting aspect of the lamp body 24 outside the vehicle cabin in the normal mode (step S313). The lamp body 24 outside the vehicle cabin includes the turn signal lamps 51, the position lamps 52, the headlights 53, and the tail lamps 54 disposed on the outer side of the vehicle 10. A procedure for determining the lighting aspect of the lamp body 24 outside the vehicle cabin in the normal mode will be described below. When the lamp body 24 outside the vehicle cabin is caused to light, the in-vehicle lamp 55, which are the lamp body 24 inside the vehicle cabin, may be caused to light. Thereafter, the notification controller 26 causes the lamp body 24 outside the vehicle cabin to light (step S315), and the vehicle 10 ends the processing shown in FIG. 7.

When the controller 18 determines in step S309 that the operation mode is the normal mode, the notification controller 26 determines a lighting aspect of the lamp body 24 outside the vehicle cabin in the power saving mode (step S317). The procedure for determining the lighting aspect of the lamp body 24 outside the vehicle cabin in the power saving mode will be described below. Thereafter, the notification controller 26 causes the lamp body 24 outside the vehicle cabin to light (step S315), and the vehicle 10 ends the processing shown in FIG. 7.

Figure 8:
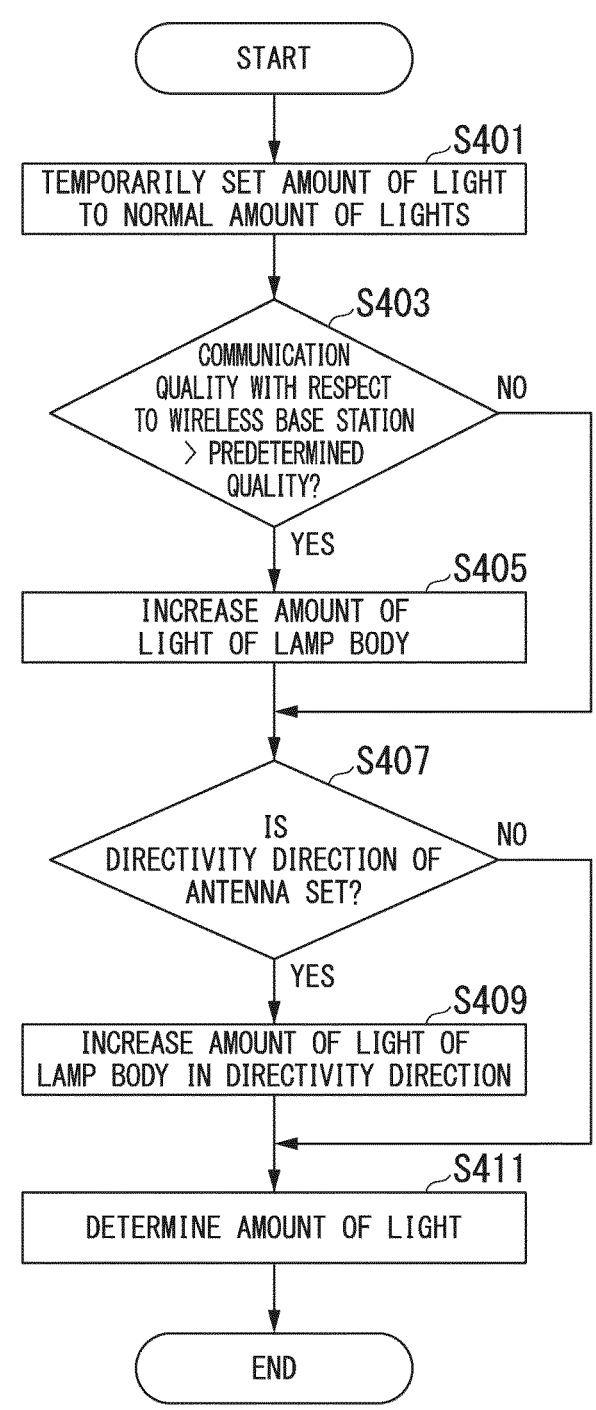
FIG. 8 is a flowchart showing an example of processing that is executed by the vehicle 10.

Subsequently, the procedure for determining the lighting aspect of the lamp body 24 outside the vehicle cabin in the normal mode will be described with reference to FIG. 8. The notification controller 26 temporarily sets an amount of light when the lamp body 24 outside the vehicle cabin is caused to light to a normal amount of light (step S401). In this case, the notification controller 26 temporarily sets the lamp bodies 24 outside the vehicle cabin to light to all of the turn signal lamps 51, the position lamps 52, the headlights 53, and the tail lamps 54. The notification controller 26 temporarily sets a lighting aspect to constant lighting. The constant lighting is lighting according to the amount of light when each component of the lamp body 24 is used for its original purpose of use.

Subsequently, the notification controller 26 determines whether or not the communication quality output by the acquirer 14 is equal to or higher than the predetermined quality (step S403). The predetermined quality is set for each type of quality. For example, when the communication quality is "the presence or absence of a communication restriction," the predetermined quality is set to "the presence of the communication restriction". The predetermined quality may be set in any way.

When the notification controller 26 determines that the communication quality is equal to or higher than the predetermined quality, the notification controller 26 changes a setting so that the amount of light of the lamp body 24 to light is increased (step S405). When the notification controller 26 determines that the communication quality is not equal to or higher than the predetermined quality, the notification controller 26 proceeds to step S407 as it is. Thus, the notification controller 26 makes the amount of light emitted by the lamp body 24 in a case in which the communication quality acquired by the acquirer 14 is equal to or higher than the predetermined quality different from that in a case in which the communication quality acquired by the acquirer 14 is lower than the predetermined quality.

In the embodiment, the notification controller 26 makes the amount of light emitted by the lamp body 24 in the case in which the communication quality acquired by the acquirer 14 is equal to or higher than the predetermined quality larger than that in the case in which the communication quality acquired by the acquirer 14 is lower than the predetermined quality. The notification controller 26 may make the amount of light emitted by the lamp body 24 in the case in which the communication quality acquired by the acquirer 14 is equal to or higher than the predetermined quality smaller than that in the case in which the communication quality acquired by the acquirer 14 is lower than the predetermined quality. For example, when the communication quality is equal to or higher than the predetermined quality, the turn signal lamps 51, the position lamps 52, and the headlights 53 may be caused to light, and when the communication quality is lower than the predetermined quality, only the turn signal lamps 51 may be caused to light.

Subsequently, the notification controller 26 determines whether or not the directivity direction of the antenna 80 is set (step S407). When the notification controller 26 determines that the directivity direction of the antenna 80 is set, the notification controller 26 changes a setting so that an amount of light of the lamp body 24 located in the directivity direction of the antenna 80 is increased (step S409). A light amount setting is maintained for the lamp bodies 24 other than the lamp bodies 24 located in the directivity direction of the antenna 80 among the lamp bodies 24 outside the vehicle cabin. The amount of light of the lamp bodies 24 other than the lamp bodies 24 located in the directivity direction of the antenna 80 among the lamp bodies 24 outside the vehicle cabin may be changed to be small in the setting or may be set to 0. Thus, the notification controller 26 makes an amount of light emitted by the lamp body 24 attached to a first side of the vehicle body of the vehicle 10 to which the antenna 80 is directed larger than an amount of light emitted by the lamp body 24 attached to a place other than the first side.

Subsequently, the notification controller 26 determines the temporarily set amount of light or a changed light amount when a change from the temporarily set amount of light is made, to be an amount of light of the lamp body 24 outside the vehicle cabin (step S411). Further, the notification controller 26 determines the components of the lamp body 24 outside the vehicle cabin subjected to the temporary setting or changed components of the lamp body 24 outside the vehicle cabin in a case in which a change is made from the components of the lamp body 24 outside the vehicle cabin subjected to the temporary setting, to be the components of the lamp body 24 to light. Thereafter, the vehicle 10 ends the processing shown in FIG. 8.

Subsequently, the procedure for determining the lighting aspect of the lamp body 24 outside the vehicle cabin in the power saving mode will be described with reference to FIG. 9. The notification controller 26 performs a temporary setting to an amount of light smaller than an amount of light when the lamp body 24 outside the vehicle cabin is caused to constantly light (step S501). In this case, the notification controller 26 temporarily sets the lamp body outside the vehicle cabin to light for all of the turn signal lamps 51, the position lamps 52, the headlights 53, and the tail lamps 54.

Subsequently, the notification controller 26 determines whether or not the SOC of the battery 40 is equal to or larger than a predetermined amount of stored electricity (step S503). When the notification controller 26 determines that the SOC of the battery 40 is equal to or larger than the predetermined amount of stored electricity, the notification controller 26 changes a setting so that the amount of light of the lamp body 24 to light is increased (step S505). When the notification controller 26 determines that the SOC of the battery 40 is not equal to or larger than the predetermined amount of stored electricity (is smaller than the predetermined amount of stored electricity), the notification controller 26 proceeds to step S507 as it is. Thus, the notification controller 26 increases the amount of light emitted by the lamp body 24 in a case in which the SOC of the battery 40 is equal to or larger than the predetermined amount of stored electricity, as compared with a case in which the SOC of the battery 40 is smaller than the predetermined amount of stored electricity.

Subsequently, the notification controller 26 determines the temporarily set amount of light or a changed light amount when a change from the temporarily set amount of light is made, to be the amount of light of the lamp body 24 outside the vehicle cabin (step S507). Further, the notification controller 26 determines the components of the lamp body 24 outside the vehicle cabin subjected to the temporary setting or changed components of the lamp body 24 outside the vehicle cabin in a case in which a change is made from the components of the lamp body 24 outside the vehicle cabin subjected to the temporary setting, to be the components of the lamp body 24 to light. Thereafter, the vehicle 10 ends the processing shown in FIG. 9.

Figure 10:
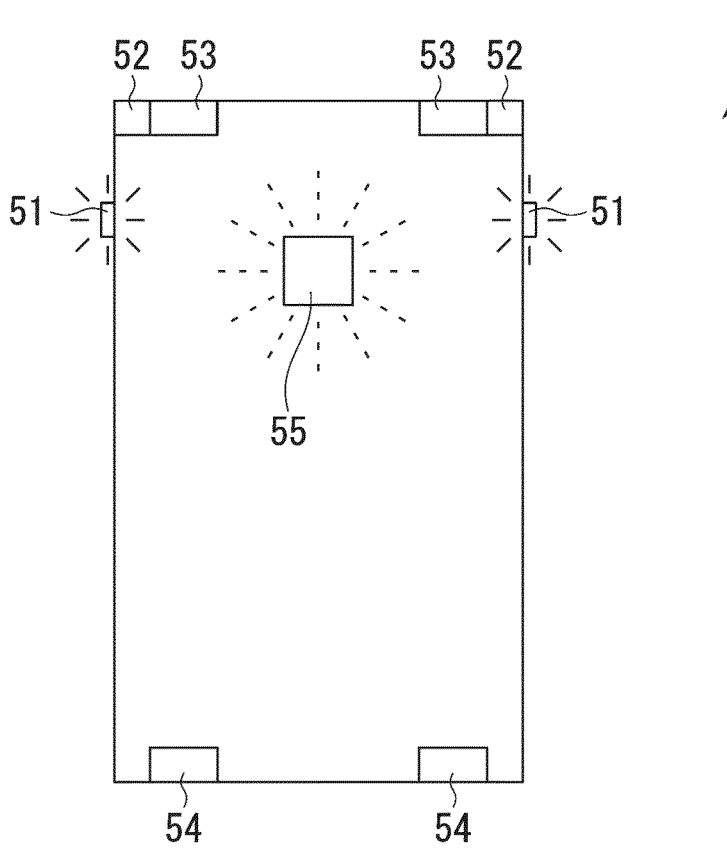
FIG. 10 is a diagram showing an example of an aspect of lighting or blinking of a lamp body 24.
Figure 11:
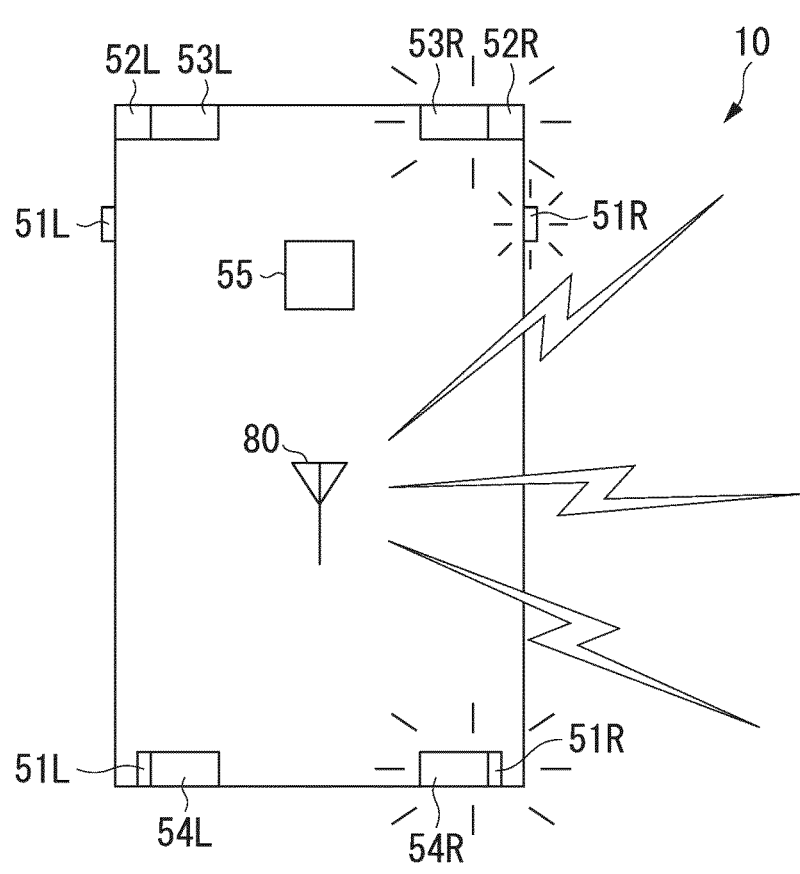
FIG. 11 is a diagram showing an example of the aspect of lighting or blinking of the lamp body 24.

In the vehicle 10, for example, when the surroundings are notified of the fact that the vehicle 10 is functioning as an access point, each component of the lamp body 24 blinks in an aspect different from a lighting or blinking aspect according to the original purpose of use of each component of the lamp body 24. For example, the in-vehicle lamp 55 constantly lights for the original purpose of use, but the in-vehicle lamp 55 blinks as shown in FIG. 10 when the surroundings are notified of the fact that the vehicle 10 is functioning as an access point. Further, the turn signal lamps 51 blinks for the original purpose of use, but the turn signal lamps 51 constantly light as shown in FIG. 10, when the surroundings are notified of the fact that the vehicle 10 is functioning as an access point In the vehicle 10, when the directivity direction of the antenna 80 is set, the amount of light of the lamp body 24 located in the directivity direction is increased. For example, as shown in FIG. 11, when the directivity direction of the antenna 80 is set to the right side of the vehicle 10, the lamp body 24 located on the right side of the vehicle 10, specifically, a right turn signal lamp 51R, a right position lamp 52R, a right headlight 53R, and a right tail lamp 54R light. The lamp body 24 located on the left side of the vehicle 10, specifically, a left turn signal lamp 51L, a left position lamp 52L, a left headlight 53L, and a left tail lamp 54L are turned off or an amount of light when each of the lamps lights becomes smaller than an amount of light of the lamp body 24 located on the right side of the vehicle 10.

Further, for example, when the directivity direction of the antenna 80 is a forward direction, the turn signal lamps 51 and the headlights 53 disposed on the front side of the vehicle 10 may be caused to light. Further, when the directivity direction of the antenna 80 is a backward direction, the turn signal lamps 51 and the tail lamps 54 disposed on the back side may be caused to light.

Next, an example of an usage aspect in which the user uses the vehicle 10 functioning as an access point (hereinafter referred to as an "AP vehicle 10") as an access point will be described.

(First Usage Aspect of Vehicle 10)

Figure 12:
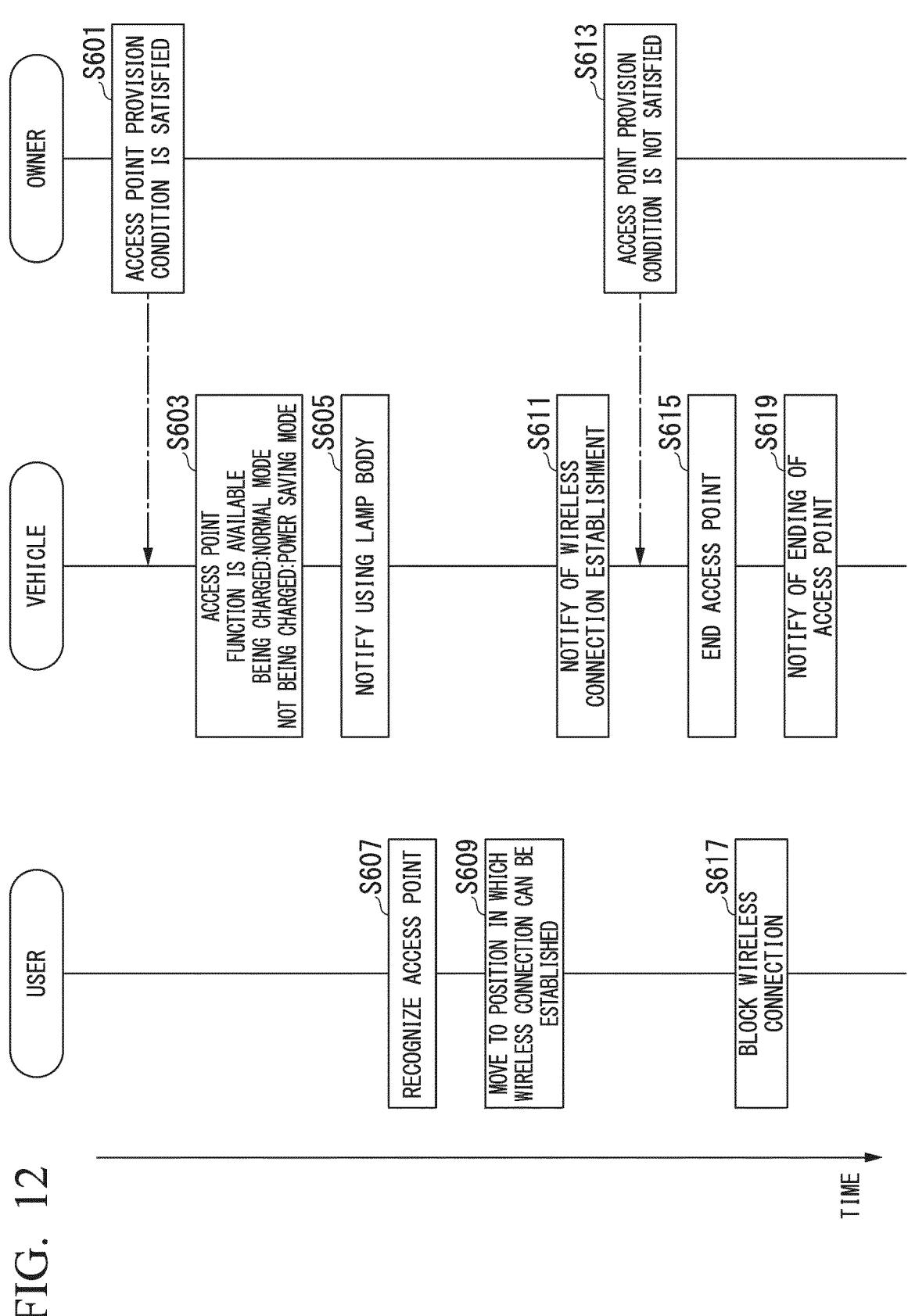
FIG. 12 is a diagram showing an example of an operation of the user U, the vehicle 10, and an owner according to change over time when mediation is performed by the vehicle 10.

First, a first usage aspect will be described. For example, as shown in FIG. 12, the access point provision condition is satisfied when the owner of the vehicle 10 stops the vehicle and starts charging the battery 40 or the SOC of the battery 40 is equal to or larger than the reference amount of stored electricity (step S601).

When the access point provision condition is satisfied, the vehicle 10 sets itself as an access point and functions as the access point to become the AP vehicle 10, and the user can use the access point function of the AP vehicle 10 (step S603). When the battery 40 of the AP vehicle 10 is being charged, the controller 18 sets the operation mode to the normal mode. When the battery 40 of the AP vehicle 10 is not being charged, but the SOC of the battery 40 is equal to or larger than the reference amount of stored electricity, the controller 18 sets the operation mode to the power saving mode.

Subsequently, the AP vehicle 10 notifies the surroundings that the AP vehicle 10 is functioning as an access point by operating the wiper W or causes the lamp body 24 to light or blink (step S605). An aspect of lighting or blinking of the lamp body 24 differs depending on conditions such as an illuminance around the AP vehicle 10, the SOC of the battery 40, communication quality between the wireless base station 100 and the AP vehicle 10, and the directivity of the antenna 80.

The user U who has seen the AP vehicle 10 notifying that the AP vehicle 10 is functioning as an access point recognizes that the vehicle is functioning as an access point (step S607). Subsequently, the user U moves to a position in which a wireless connection between the mobile terminal 200 of the user U and the AP vehicle 10 can be made (step S609), and a wireless connection between the mobile terminal 200 and the AP vehicle 10 is established. When the wireless connection is established, the notifier 20 of the AP vehicle 10 notifies the user of the mobile terminal 200 that the wireless connection has been established, by causing the lamp body 24 to blink (step S611).

Thereafter, for example, when the user starts traveling of the AP vehicle 10 or the charging of the battery 40 ends, the access point provision condition is not satisfied (step S613). When the access point provision condition is not satisfied, the controller 18 of the AP vehicle 10 sets the operation mode to the off mode, and ends the access point function to make the access point function unavailable (step S615).

When the access point function is made unavailable, the wireless connection with the AP vehicle 10 in the mobile terminal 200 of the user U is blocked (step S617). Thereafter, the notifier 20 of the AP vehicle 10 turns off each component of the lamp body 24 that has lit or blinked to notify of the fact that the access point function is ended and made unavailable (step S619).

In the first usage aspect, for example, when the owner parks the vehicle 10 in a parking lot of a store, a situation in which charging of the vehicle 10 is performed and caused to functions as an access point is assumed. In this case, for example, the vehicle 10 is caused to function as an access point while the owner parks the vehicle 10 in the parking lot and does shopping at the store. In this case, the vehicle 10 notifies the surroundings that the vehicle 10 is functioning as an access point using the notifier 20. The user U of the mobile terminal 200 passing around the parking lot receives the notification from the notifier 20 and uses the function of the vehicle 10 as the access point. Thereafter, when the owner ends the shopping at the store and moves the vehicle from the parking lot, the function as the access point is ended.

(Second Usage Aspect of Vehicle 10)

Next, a second usage aspect of the vehicle 10 will be described. In the second usage aspect, the vehicle 10 transmits the operation mode in the controller 18 to the wireless base station 100, and the wireless base station 100 stores the operation mode of the vehicle 10. The user U can inquire about a position of the AP vehicle 10.

The wireless base station 100 transmits information on the position of the AP vehicle 10 to the mobile terminal 200 in the vicinity of the mobile terminal 200 in response to an inquiry from the mobile terminal 200. The user U of the mobile terminal 200 who has received the information on the position of the AP vehicle 10 can recognize the position of the AP vehicle 10, move to the vicinity thereof, and use the access point function of the AP vehicle 10.

Figure 13:
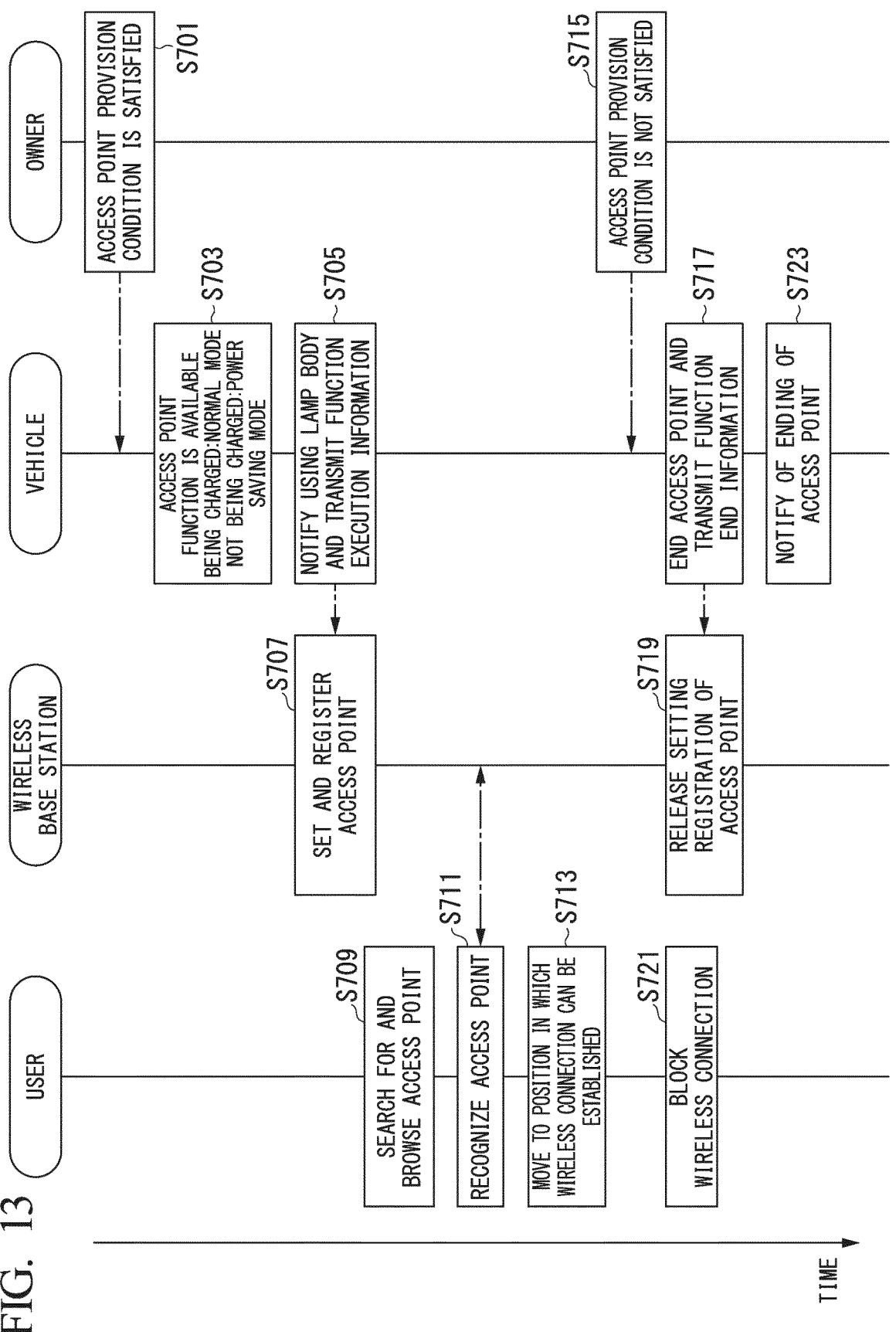
FIG. 13 is a diagram showing an example of an operation of the user U, the vehicle 10, and the owner according to a time change when mediation is performed by the vehicle 10.

For example, as shown in FIG. 13, the access point provision condition is satisfied when the owner of the vehicle 10 stops the vehicle and starts charging the battery 40 or the SOC of the battery 40 is equal to or larger than the reference amount of stored electricity (step S701). When the access point provision condition is satisfied, the vehicle 10 sets itself as an access point and functions as the access point to become the AP vehicle, and the user can use the access point function of the AP vehicle 10 (step S703).

Subsequently, the AP vehicle 10 notifies the surroundings that the AP vehicle 10 is functioning as an access point by operating the wiper W or causes the lamp body 24 to light or blink (step S705). The usage aspect up to this point is the same as the first usage aspect. In the second usage aspect, the AP vehicle 10 performs notification using the lamp body 24 and transmits function execution information indicating that the AP vehicle 10 is functioning as an access point to the wireless base station 100 (step S705).

The wireless base station 100 that has received the function execution information sets and registers information on the AP vehicle 10 (step S707). Subsequently, when the user U is looking for the AP vehicle 10, the user U inquires of the wireless base station 100 about the position of the AP vehicle 10. Thus, the user U searches for and browses the position of the AP vehicle 10 (step S709).

Figure 14:
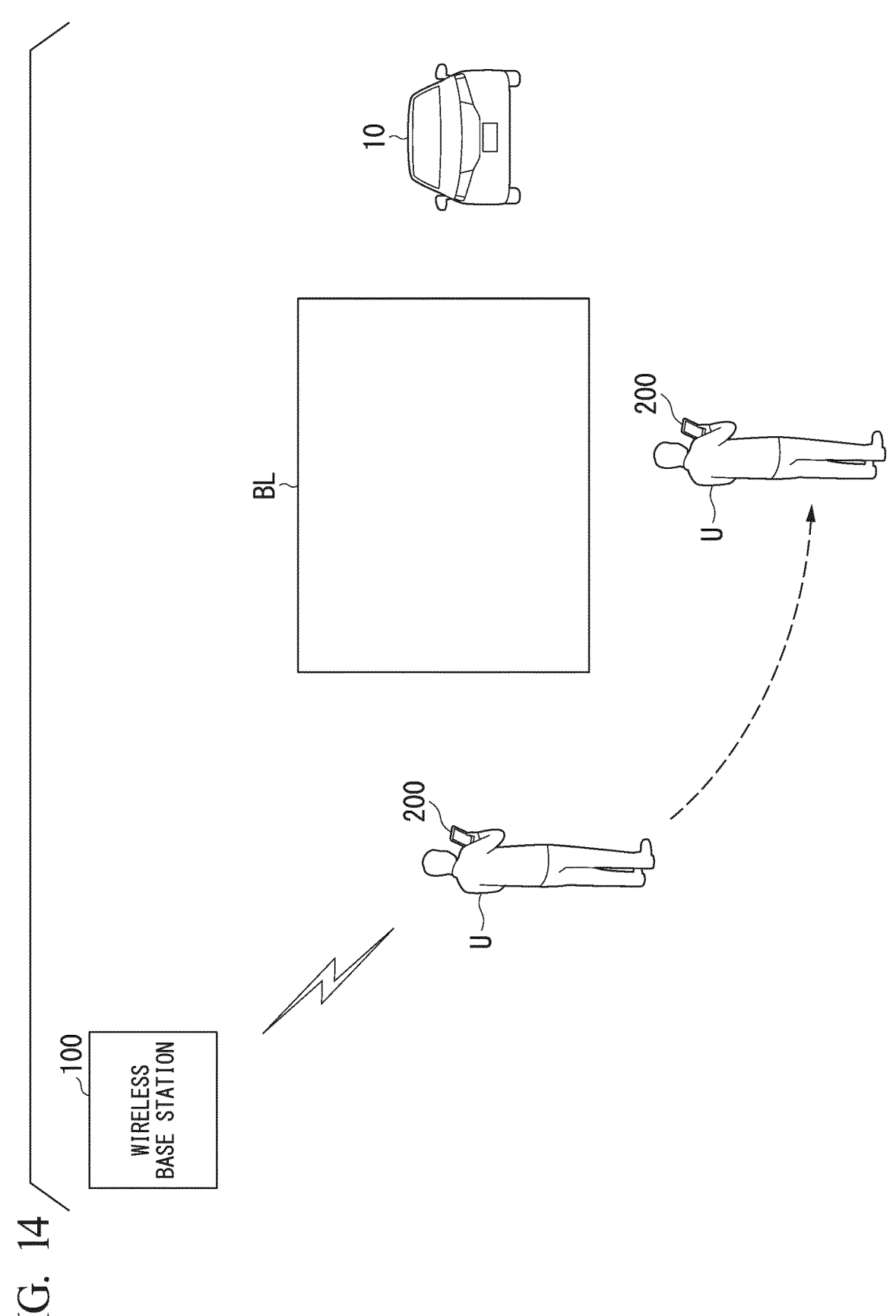
FIG. 14 is a diagram showing an example of a change in a positional relationship between the user U and the vehicle 10.

The user U who has searched for or browsed the position of the AP vehicle 10 recognizes the position of the AP vehicle 10 (step S711). Subsequently, the user U moves to a position in which a wireless connection between the mobile terminal 200 of the user U and the AP vehicle 10 can be made (step S713). For example, as shown in FIG. 14, the AP vehicle 10 may be behind a building BL that is an obstacle when viewed from the user U. In this case, even when the AP vehicle 10 causes the lamp body 24 to light to notify of the fact that the AP vehicle 10 is functioning as an access point, the user U cannot visually recognize the lamp body 24 and it is difficult for the user U to recognize the AP vehicle 10. Therefore, the wireless connection between the mobile terminal 200 and the AP vehicle 10 is established by the user U searching for or browsing the position of the AP vehicle 10 using the mobile terminal to recognize the position of the AP vehicle 10 and move to the position. When the wireless connection is established, the notifier 20 of the AP vehicle 10 notifies the user of the mobile terminal 200 that the wireless connection has been established by causing the lamp body 24 to blink.

Thereafter, when the user starts traveling of the AP vehicle 10 or the charging of the battery 40 ends, the access point provision condition is not satisfied (step S715). When the access point provision condition is not satisfied, the controller 18 of the vehicle 10 sets the operation mode to the off mode and ends the access point function so that the access point function is unavailable (step S717). The vehicle 10 ends the access point function so that the access point function is unavailable, and transmits function end information for ending the function as an access point to the wireless base station 100 (step S717).

The wireless base station 100 that has received the function end information releases the setting registration of the information on the AP vehicle 10 (step S719). Then, when the access point function of the vehicle 10 becomes unavailable, the wireless connection with the vehicle 10 in the mobile terminal 200 of the user U is blocked (step S721). Thereafter, the notifier 20 of the vehicle 10 turns off each component of the lamp body 24 that has lit or blinked, to notify of the fact that the access point function is ended and made unavailable (step S723).

According to the embodiment described above, the notifier 20 is used to notify of the fact that the vehicle 10 is functioning as an access point. Therefore, the vehicle 10 can cause the user of the mobile terminal 200 to easily recognize that the vehicle 10 has a function as an access point.

Further, the notifier 20 notifies of the fact that the vehicle 10 is functioning as an access point by causing the lamp body 24 to light or blink. Therefore, it is possible to appeal, to eyes of the user, that the vehicle 10 is functioning as an access point. Further, the lamp body 24 is existing equipment in the vehicle 10, such as the turn signal lamps 51, the position lamps 52, the headlights 53, the tail lamps 54, and the in-vehicle lamp 55. Therefore, it is possible to effectively use the existing equipment. Therefore, it is possible to contribute to cost reduction when the vehicle 10 is manufactured.

Further, the notifier 20 causes the turn signal lamps 51 to constantly light or causes the in-vehicle lamp 55 to blink to notify of the fact that the vehicle 10 is functioning as an access point. Therefore, the notifier 20 performs the notification in an aspect different from the original purpose of use of the turn signal lamps 51 or the in-vehicle lamp 55. Therefore, it is possible to cause the access point function of the vehicle 10 to be recognized while making it difficult to cause confusion with the time of constant use of the existing equipment. For example, because the turn signal lamp 51 blinks when the turn signal lamps 51 becomes a hazard lamp (warning light), and constantly lights when the turn signal lamp 51 notifies of the access point function, it is possible to easily distinguish between both. Further, because the in-vehicle lamp 55 that does not blink at the time of the constant use by being caused to light, it is possible to avoid misunderstanding from the owner has forgotten to turn the in-vehicle lamp 55 off and has left the in-vehicle lamp 55 on. Further, it is possible to cause the lamp body 24 to light in an aspect different from that in the constant use by causing the headlights 53, the position lamps 52, and the tail lamps 54 to blink.

Further, the notifier 20 decreases an amount of light emitted by the lamp body 24 in a case in which the illuminance measured by the illuminance measurer 30 is less than the predetermined illuminance as compared with a case in which the illuminance measured by the illuminance measurer 30 is equal to or higher than the predetermined illuminance. Therefore, because the amount of light emitted by the lamp body 24 is reduced at night as compared with the daytime, it is possible to cause the user U of the mobile terminal 200 to recognize that the vehicle 10 has the access point function using a method suitable for a surrounding environment. Further, because the amount of light emitted by the lamp body 24 is reduced at night as compared with the daytime, it is possible to prevent the lamp body 24 from being too bright at night and causing annoyance to the surroundings.

Further, the notifier 20 makes the amount of light emitted by the lamp body 24 attached to the first side of the vehicle body to which the antenna 80 directs larger than the amount of light emitted by the lamp body 24 attached to the place other than the first side. Therefore, it is possible to deliver the directivity direction of the antenna 80 to the user of the mobile terminal 200 in an easy-to-understand manner.

Further, the notifier 20 increases the amount of light emitted by the lamp body 24 in a case in which the amount of stored electricity of the battery 40 is equal to or larger than the predetermined amount of stored electricity as compared with a case in which the amount of stored electricity of the battery 40 is smaller than the predetermined amount of stored electricity. Further, the battery 40 can be externally charged, and the controller 18 sets the normal mode during charging of the battery 40 and the power saving mode during non-charging. Thus, the vehicle 10 increases the amount of light emitted by the lamp body 24 during charging of the battery 40 as compared with that during non-charging. Therefore, the access point function can be provided within a range in which an influence on original performance of the vehicle is small, and shortage of the amount of stored electricity of the battery 40 can be curbed.

Further, the notifier 20 makes the amount of light emitted by the lamp body 24 in a case in which the communication quality acquired by the acquirer 14 is equal to or higher than the predetermined quality different from that in a case in which the communication quality acquired by the acquirer 14 is lower than the predetermined quality. Therefore, because the user can be notified of the communication quality, it is possible to provide a criterion for determining whether or not a wireless connection is made.

Further, when the wireless connection is established between the access point functional unit 16 and the mobile terminal 200, the notifier 20 notifies surroundings of the vehicle 10 that the wireless connection has been established. Therefore, it is possible to cause the user to easily recognize the vehicle 10 to which the wireless connection has been made.

Although, in the above embodiment, the notifier 20 notifies of the fact that the vehicle 10 functions as an access point by the wiper device 22 driving the wiper W or each component of the lamp body 24 lighting or blinking, other aspects may be used for the notification. For example, a sound output by an output unit that outputs a sound (for example, music) such as a speaker or a horn directed to the outside of the vehicle may be used to notify of the fact that the vehicle 10 is functioning as an access point.

Further, a screen may be provided in the vehicle 10 to display a sentence informing that the vehicle is functioning as an access point, such as "Wireless Internet access point is being provided". Further, when the vehicle 10 is functioning as an access point, a text such as "Wireless Internet access point is being provided" may be displayed on a monitor or meter screen of a navigation device in the vehicle 10.

Further, the components of the lamp body 24 may include components other than the turn signal lamps 51, the position lamps 52, the headlights 53, the tail lamps 54, and the in-vehicle lamp 55. For example, the components of the lamp body 24 may include a high mount stop lamp, a rear fog lamp, a license lamp, a room lamp, a pilot lamp, and the like. Further, an aspect in which the lamp body 24 lights or blinks may be any aspect, and some or all of the lamp bodies 24 may light or blink. Further, in the lamp bodies 24 provided side by side in one direction, the lamp bodies 24 may be caused to light or blink so that light flowing in one direction can be seen.

Alternatively, a movable object such as a power window or an electric mirror may be operated to notify of the fact that the vehicle 10 is functioning as an access point. Further, when the vehicle 10 is provided with, for example, a rotating light like a special vehicle, the rotating light may be caused to light or blink to notify of the fact that the vehicle 10 is functioning as an access point. Further, it is possible to notify of the fact that the vehicle 10 is functioning as an access point by using a plurality of light, sound, and movable object at the same time.

Further, in a case in which the amount of light is reduced as compared with that in a predetermined aspect, an aspect may be an aspect in which the amount of light is reduced as compared with that in the unit predetermined aspect, may be an aspect in which the amount of light is gradually reduced, or may be an aspect in which the amount of light is seamlessly reduced. Further, when the amount of light is reduced as compared with the predetermined aspect, the amount of light emitted by each component of the lamp body may be reduced, or the number (type) of respective components of the lamp body to light may be reduced. For example, the notifier 20 causes the headlights 53 to light when the controller 18 sets the operation mode to the normal mode, but may cause the position lamps 52 to light when the controller 18 sets the power saving mode to the normal mode.

Although the present invention has been described above using the embodiment, a technical scope of the present invention is not limited to the scope described in the above embodiment. It is apparent to those skilled in the art that various changes or improvements can be made to the above embodiment. It is apparent from the description of the claims that forms with such changes or improvements may be included in the technical scope of the present invention.

REFERENCE SIGNS LIST

10 Vehicle
12 Communicator
14 Acquirer
16 Access point functional unit
18 Controller
20 Notifier
22 Wiper device
24 Lamp body
26 Notification controller
30 Illuminance measurer
40 Battery
42 Battery sensor
51 Turn signal lamp
52 Position lamp
53 Headlight
54 Tail lamp
55 In-vehicle lamp
80 Antenna
100 Wireless base station
200 Mobile terminal
BL Building
NW Network
U User
W Wiper

What is claimed is:

1. A movable vehicle, comprising:

an access point functional unit including an antenna and configured to function as an access point by wirelessly communicating with a terminal device around the vehicle; and a notifier configured to notify surroundings that the vehicle is functioning as an access point, wherein the notifier includes a movable object, and causes the movable object to operate when the vehicle is functioning as an access point.

2. The vehicle according to claim 1, wherein the movable object includes a wiper device.

3. The vehicle according to claim 1, wherein the movable object includes a power window or an electric mirror.

4. The vehicle according to claim 1, wherein the notifier makes an operating speed of the movable object lower in a case in which an operation mode of the vehicle is set to a power saving mode as compared with that in which the operation mode of the vehicle is set to a normal mode.

5. The vehicle according to claim 1, further comprising:

a storage battery, wherein the notifier makes an operating speed of the movable object in a case in which an amount of stored electricity of the storage battery is equal to or larger than a predetermined amount of stored electricity higher than that in a case in which the amount of stored electricity of the storage battery is smaller than the predetermined amount of stored electricity.

6. The vehicle according to claim 1, further comprising:

an externally chargeable storage battery, wherein the notifier makes an operating speed of the movable object in a case in which the storage battery is externally charged higher than that in a case in which the storage battery is not externally charged.

7. The vehicle according to claim 1, further comprising:

an acquirer configured to acquire information on communication quality between a wireless base station and the access point functional unit, wherein the notifier makes an operating speed of the movable object in a case in which the communication quality acquired by the acquirer is equal to or higher than predetermined quality different from that in a case in which the communication quality acquired by the acquirer is lower than the predetermined quality.

8. A movable vehicle, comprising:

an access point functional unit including an antenna and configured to function as an access point by wirelessly communicating with a terminal device around the vehicle; and a notifier configured to notify surroundings that the vehicle is functioning as an access point, wherein the notifier includes an output unit, and causes the output unit to output a sound when the vehicle is functioning as an access point.

9. The vehicle according to claim 8, wherein the output unit includes a speaker or a horn directed to outside of the vehicle.

10. A movable vehicle, comprising:

an access point functional unit including an antenna and configured to function as an access point by wirelessly communicating with a terminal device around the vehicle; and a notifier configured to notify surroundings that the vehicle is functioning as an access point, wherein the notifier includes a screen, and causes the screen to display a sentence informing that the vehicle is functioning as an access point when the vehicle is functioning as an access point.

* * * * *